United States Patent
Haberl et al.

(10) Patent No.: US 11,247,544 B2
(45) Date of Patent: Feb. 15, 2022

(54) FOLDING TOP COMPRISING A TOP COVER

(71) Applicant: Webasto SE, Stockdorf (DE)

(72) Inventors: Franz Haberl, Stockdorf (DE); Magnus Sviberg, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 76 days.

(21) Appl. No.: 16/546,621

(22) Filed: Aug. 21, 2019

(65) Prior Publication Data
US 2020/0079195 A1    Mar. 12, 2020

(30) Foreign Application Priority Data
Sep. 10, 2018   (DE) ................... 102018121995.4

(51) Int. Cl.
*B60J 7/12*    (2006.01)
*B60J 1/18*    (2006.01)

(52) U.S. Cl.
CPC ........... *B60J 7/1226* (2013.01); *B60J 1/1815* (2013.01)

(58) Field of Classification Search
CPC ........... B60J 7/12; B60J 7/1226; B60J 7/1252
USPC ....................... 296/107.09, 107.12
See application file for complete search history.

(56) References Cited

U.S. PATENT DOCUMENTS

| | | | | |
|---|---|---|---|---|
| 6,022,064 A | * | 2/2000 | Robbins | B60J 7/1252 296/107.12 |
| 6,715,823 B2 | * | 4/2004 | Schmitt | B60J 7/1226 296/107.01 |
| 7,854,249 B2 | | 12/2010 | Respondek et al. | |
| 8,465,081 B2 | * | 6/2013 | Just | B60J 7/1234 296/107.06 |
| 2014/0252795 A1 | * | 9/2014 | Willard | B60J 7/1265 296/108 |

FOREIGN PATENT DOCUMENTS

| | | | | |
|---|---|---|---|---|
| CN | 207549923 U | * | 6/2018 | |
| DE | 202006012235 U1 | | 11/2006 | |
| DE | 102007062093 A1 | | 11/2010 | |
| DE | 102011014691 A1 | | 9/2012 | |
| EP | 1925482 A2 | * | 5/2008 | ............ B60J 7/1204 |
| FR | 2924382 A1 | * | 6/2009 | ............ B60J 7/123 |
| WO | WO-2004056597 A1 | * | 7/2004 | ............ B60J 7/1234 |

* cited by examiner

*Primary Examiner* — D Glenn Dayoan
*Assistant Examiner* — Kevin P Weldon
(74) *Attorney, Agent, or Firm* — Fitch, Even, Tabin & Flannery, LLP

(57) ABSTRACT

A folding top for a convertible vehicle, is provided having a top linkage and a top cover which may have a first fabric cut and a second fabric cut connected to the first fabric cut. The two fabric cuts may be connected via a stretchable portion which is made of an elastically stretchable fabric whose stretchability is greater than that of the two fabric cuts.

9 Claims, 4 Drawing Sheets

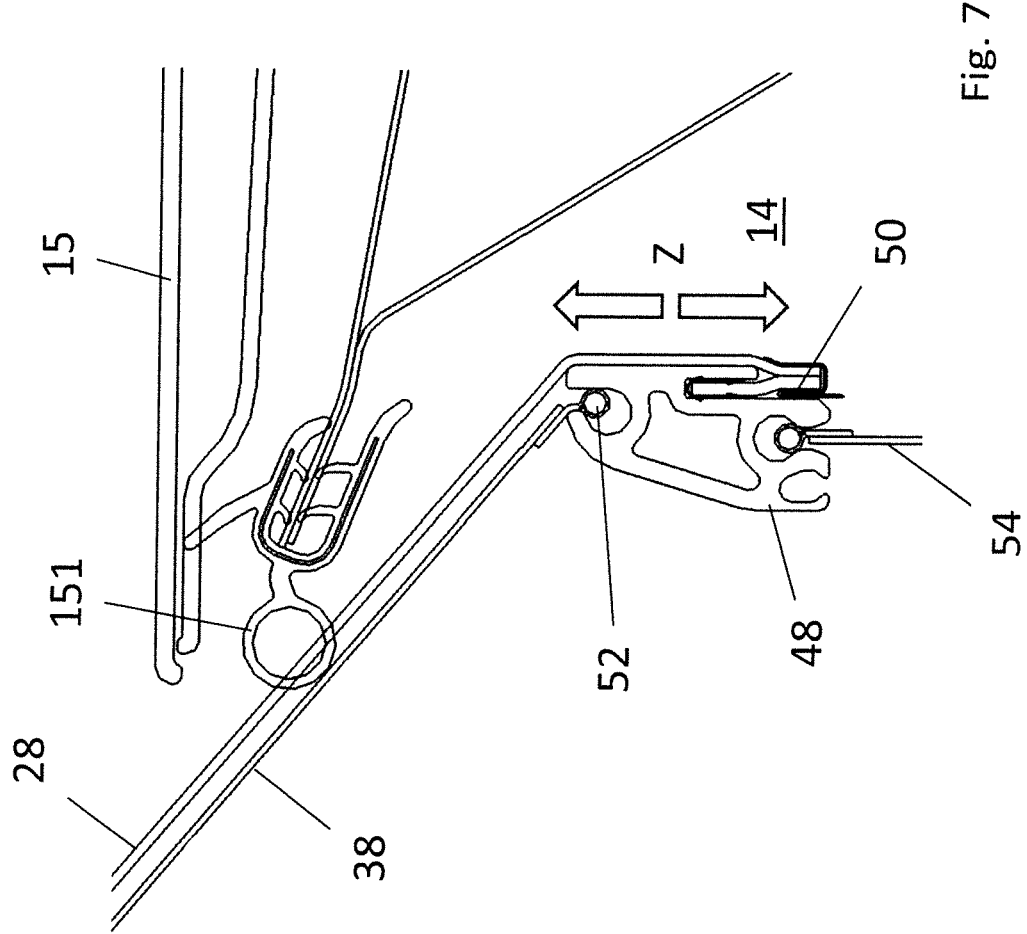

FOLDING TOP COMPRISING A TOP COVER

CROSS-REFERENCE TO RELATED APPLICATION

This application claims priority from German Patent Application Number DE 10 2018 121 995.4, filed Sep. 10, 2018, which is hereby incorporated herein by reference in its entirety for all purposes.

FIELD

The invention relates to a folding top of a convertible vehicle having the features of the preamble of claim 1.

BACKGROUND

A folding top of this kind is known from the art and is a displaceable roof which is displaceable between a closed position, in which it covers a vehicle interior, and a storage position, in which the vehicle interior is uncovered and in which the top is stored in a rear storage space of the vehicle in question. For being displaced, the folding top comprises a top linkage by means of which a top cover is extendable. The top linkage comprises a linkage assembly on either side of a vertical longitudinal center plane of the top, each linkage assembly being pivotably mounted on a main bearing fixed to the vehicle. The two linkage assemblies are connected to each other via transverse bows. The top cover, which is extendable by means of the top linkage, has multiple fabric cuts which are connected to each other and which are each made of a textile material. To be able to meet the requirements regarding weather resistance and longevity, the only materials that can be used for the fabric cuts so far are materials of little stretchability. Hence, production tolerances for the top cover have to be kept narrow.

SUMMARY

The object of the invention is to provide a folding top of the above kind that has a top cover that exhibits weather resistance and longevity on the one hand and that can be variably used for different types of tops on the other hand.

According to the invention, this object is attained by the folding top having the features of claim 1.

The folding top according to the invention comprises a top linkage and a top cover which has a first fabric cut and a second fabric cut connected to the first fabric cut, wherein the two fabric cuts are connected via a stretchable portion which is made of an elastically stretchable material whose stretchability is greater than that of the two fabric cuts.

The at least two fabric cuts of the top cover which are connected via the at least one stretchable portion may be made of conventional top cover materials and fabrics that meet the requirements in particular regarding weather resistance, UV protection, color, water tightness and the like. Unlike the top covers known from the state of the art, the two fabric cuts are not connected to each other directly; instead, they can move relative to each other owing to the interposition of the stretchable portion. The stretchable portion, which may be disposed below the two fabric cuts, does not have to meet the above-mentioned requirements required of common top cover materials. Thus, the shape of the top cover can be changed by means of the top linkage, such as by shifting individual bows and/or links of the top linkage. So the top cover configured according to the invention allows the variability of a folding top to be significantly increased. For instance, it is possible for a top covering a back seat to take a flat shape when the back seat is not occupied and no head room is needed in this area. When the back seat is occupied, the top cover can be stretched wide. Also, the folding top according to the invention can be aerodynamically adapted to the driving behavior of the vehicle in question, such as a function of speed. Moreover, design elements such as power domes or the like may be realized.

In a preferred embodiment of the folding top according to the invention, the first fabric cut covers the second fabric cut in an overlap area, the stretchable portion being disposed in the overlap area between the first fabric cut and the second fabric cut, so as to ensure that the entire outer surface of the top cover is sufficiently weather resistant.

In a specific embodiment of the folding top according to the invention, the stretchable portion extends into a folded portion of the first fabric cut. In particular, the stretchable portion is attached to the upper surface of the second fabric cut. This ensures that the stretchable portion does not form an outer skin element of the top cover, i.e. the stretchable portion is not exposed to the environment. The first fabric cut is in contact with the second fabric cut via the folded portion.

To ensure that the first fabric cut is in close-fitting contact with the second fabric cut, it is preferably tensioned against the second fabric cut by means of a tension cable. In particular, the tension cable extends through the folded portion in its longitudinal direction.

Conventionally, a top cover comprises a fabric cut that forms a center part whose lateral edges are connected to other fabric cuts which each form a side part associated with a roof side beam. In this case, the side parts each form a second fabric cut which is connected to the first fabric portion, which is formed by the center part, via a stretchable portion.

To increase the functioning of the folding top configured according to the invention and comprising two second fabric cuts, at least one stretchable element may be disposed between the two second fabric cuts, said stretchable element being made of an elastically stretchable fabric whose stretchability is greater than that of the two second fabric cuts and whose elasticity counteracts the elasticity of the two stretchable portions.

The stretchable element may be a fabric cut made of an elastic material disposed at least largely parallel to a center part of the top cover, which has a rear window cutout and which forms the actual center roof portion of the folding top. In this case, the stretchable element preferably also has a rear window cutout.

For example, the top linkage according to the invention comprises a corner bow which is height-adjustable in a closed position of the top. The height adjustability allows the head room available in a rear compartment of the vehicle interior to be changed, the top cover being able to compensate the height adjustment through the at least one stretchable portion.

Furthermore, the folding top according to the invention may comprise a rear tension bow which is connected to a rear edge of the top cover and which is height-adjustable when the top is in a closed position. Height adjustment may be required in order to ideally adapt the top cover to the stretching behavior of the stretchable portions and of the stretchable element.

Other advantages and advantageous embodiments of the subject-matter of the invention are apparent from the description, the drawing and the claims.

An embodiment of a convertible vehicle comprising a folding top according to the invention is illustrated in a schematically simplified manner in the drawing and will be explained in more detail in the following description.

BRIEF DESCRIPTIONS OF THE DRAWINGS

Figure 3:
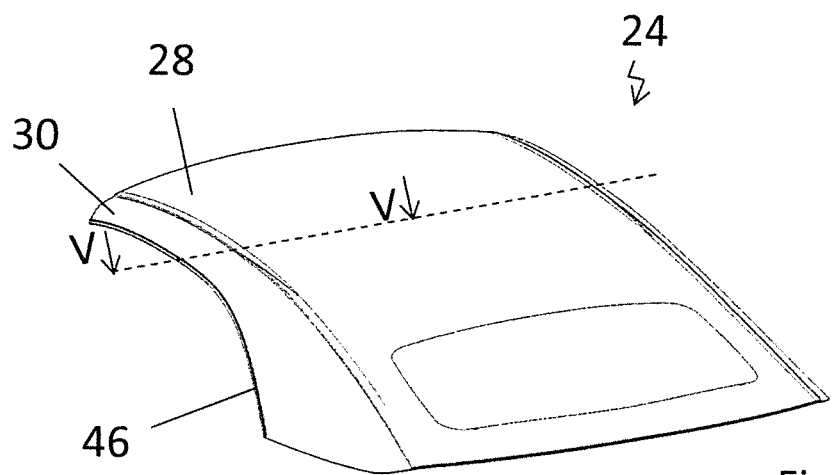
Figure 4:
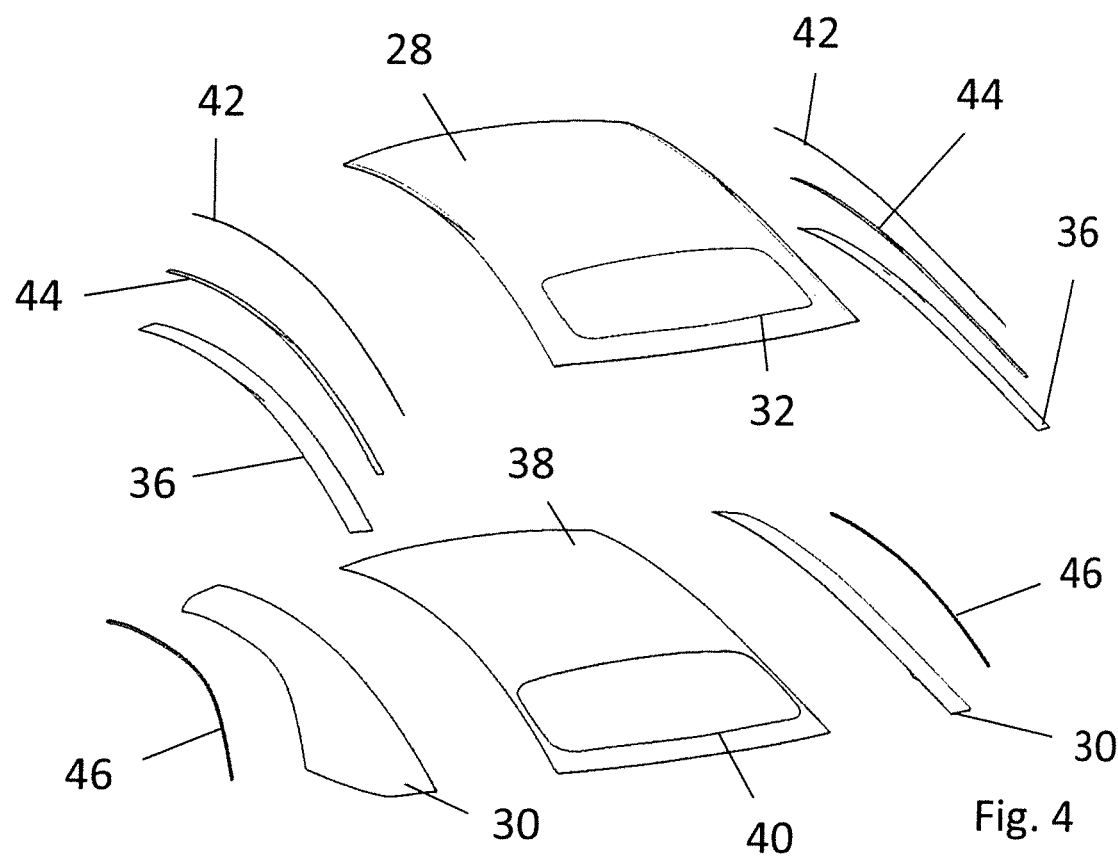
Figure 5:
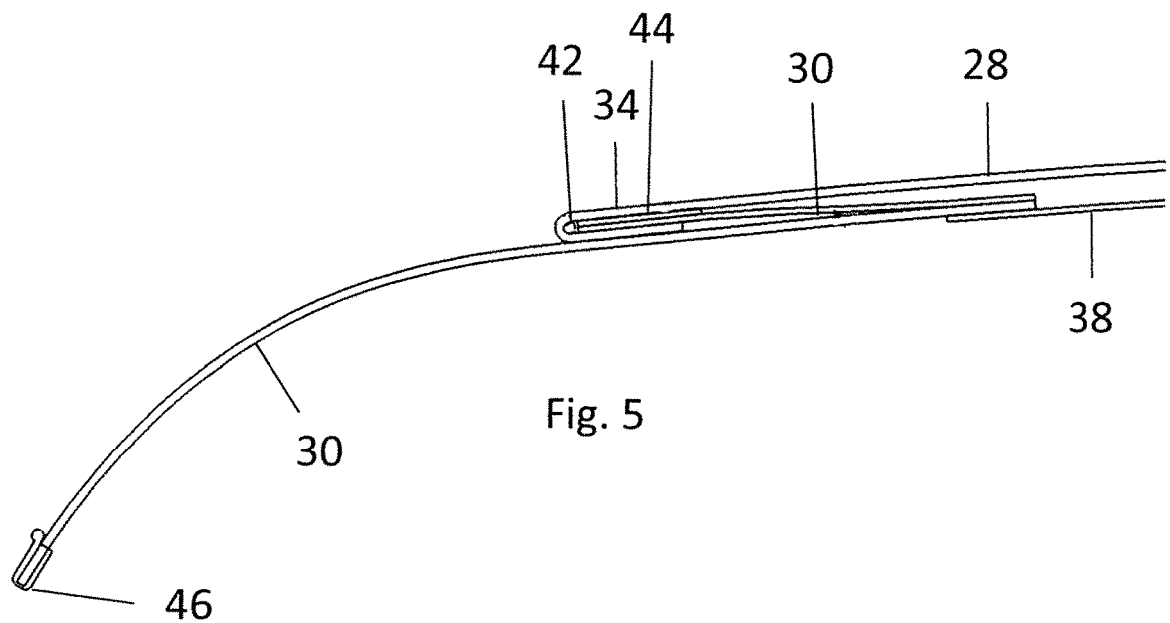
Figure 6:
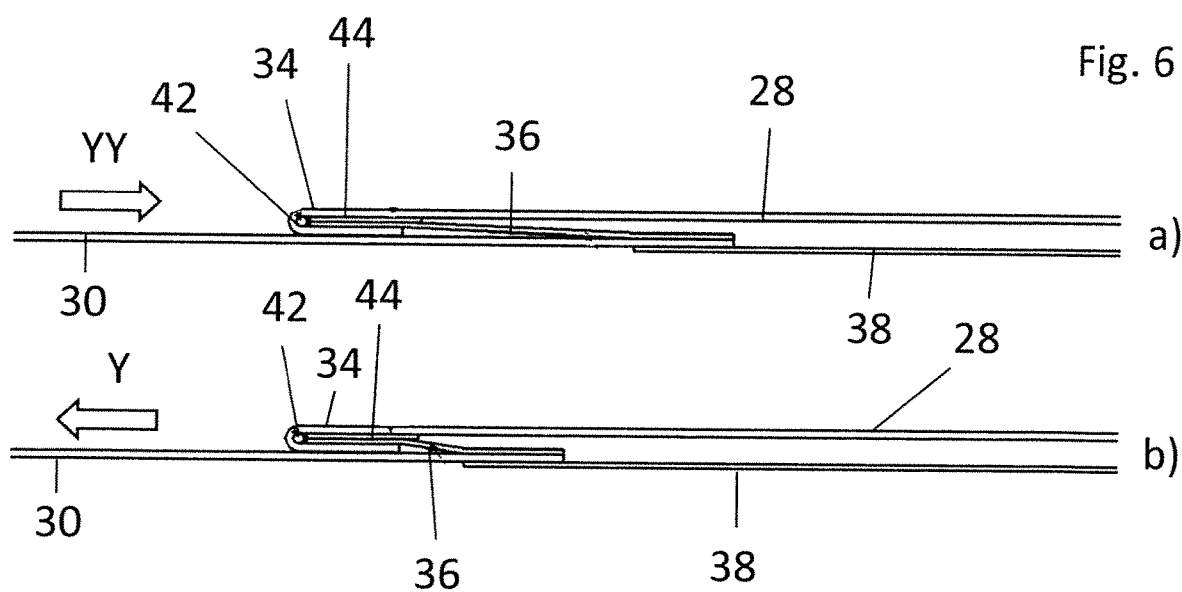

to FIG. 3 is a perspective rear view of a top cover of the folding top;

FIG. 4 is an exploded illustration of the top cover;

FIG. 5 shows a section through the top cover of FIG. 3 along line V-V in FIG. 3;

FIG. 6 shows the top cover for the flattened top shape (a) and for the widened top shape (b); and FIG. 7 shows a section through a rear portion of the top cover together with a rear tension bow and a top storage space lid along a vertical longitudinal center plane of the vehicle.

DETAILED DESCRIPTION

Figure 1:
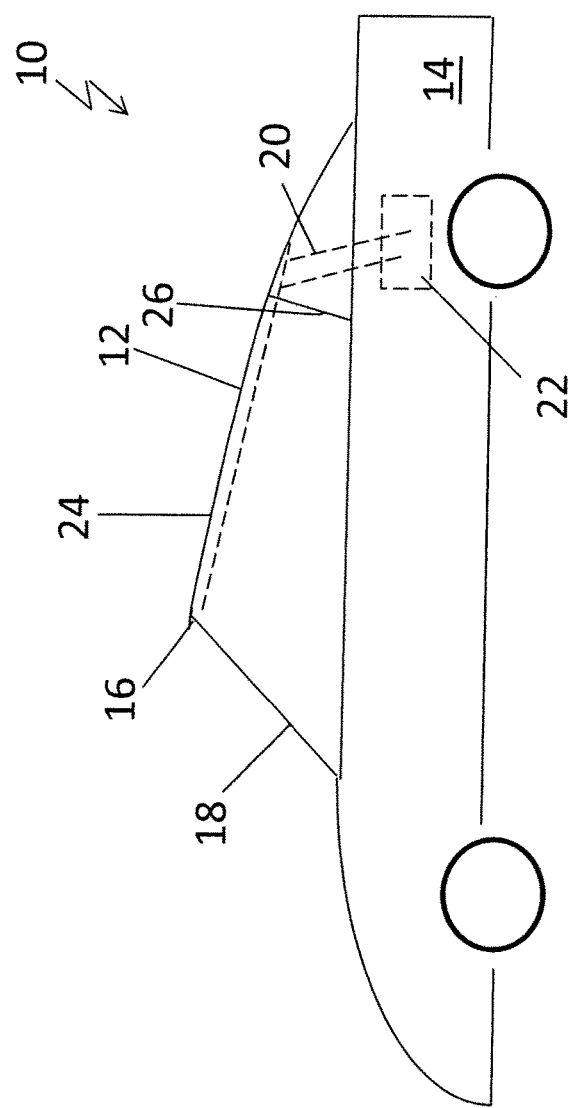
FIG. 1 is a side view of a convertible vehicle comprising a folding top which is in its flattened shape.
Figure 2:
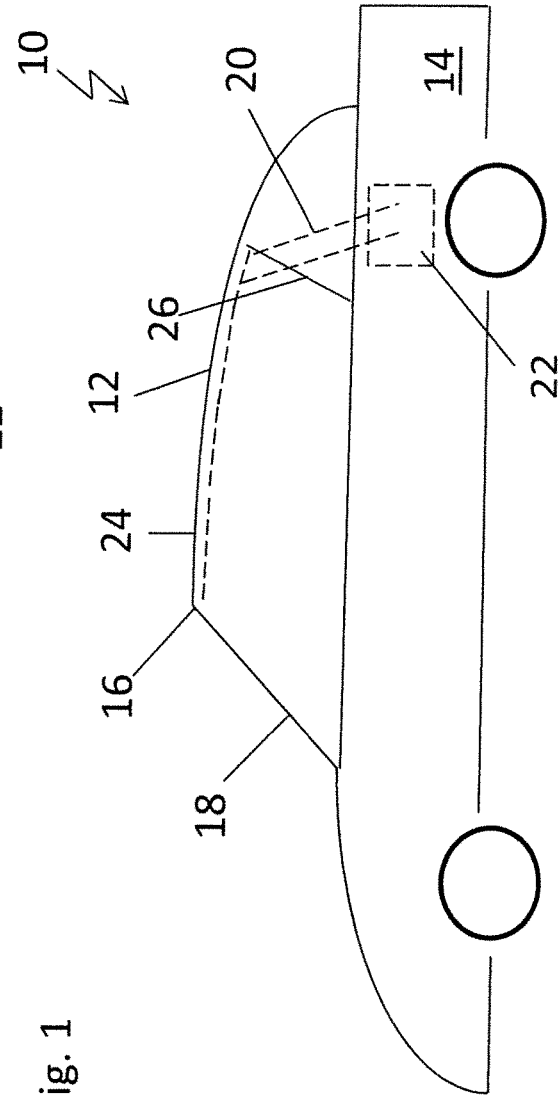
FIG. 2 is a view of the convertible vehicle corresponding to FIG. 1, showing a widened folding top.

The drawing shows a motor vehicle 10 realized as a convertible vehicle and equipped with a folding top 12 which forms a vehicle roof and which is displaceable between a closed position, which is illustrated in FIGS. 1 and 2 and in which a vehicle interior is covered, and a storage position (not shown), in which the vehicle interior is uncovered and in which folding top 12 is accommodated in a top storage space 14 of motor vehicle 10. In the closed position, the front edge of folding top 12 is fixed to a front header 16 which forms a leg of a frame of a windshield 18 extending in the transverse direction of the vehicle.

For being displaced, folding top 12 comprises a top linkage 20 which has a linkage assembly on either side of a vertical longitudinal center plane of the top, each linkage assembly being pivotably mounted on a main bearing 22 fixed to the vehicle. A top cover 24, which is illustrated on its own in FIGS. 3 to 6, can be extended using top linkage 20 so as to realize the closed position.

Furthermore, a top storage space lid 15 is in contact with top cover 24 from the outside via a weather strip 151 in the rear area when folding top 12 is in the closed position.

As can be seen in FIGS. 1 and 2, top linkage 20 further comprises a displaceable corner bow 26 by means of which the shape of folding top 12 can be changed when folding top 12 is in its closed position, namely between a flattened shape, which is shown in FIG. 1 and in which corner bow 26 is retracted, and a widened shape, in which corner bow 26 is extended or extracted, thus increasing the head room for any occupants of a back seat of motor vehicle 10. When folding top 12 is in its widened shape, top cover 24 is stretched wide in comparison to the flattened shape.

Top cover 24 comprises a center part 28 and two side parts 30 as outer skin elements, each of which is made of a weather-resistant, water-tight and foldable material. Center part 28, which is provided with a rear window cutout 32, forms a first fabric cut, and side parts 30, which are each associated with a roof side beam and laterally cover top linkage 20, each form a second fabric cut. At each of its lateral edges with respect to the vertical longitudinal center plane of the top, center part 28 forms a folded portion 34 into which a stretchable fabric strip extends, said stretchable fabric strip forming a stretchable portion 36. At its edge portion facing away from folded portion 34, stretchable portion 36 is attached to the upper surface of respective side part 30.

Furthermore, the two side parts 30 are connected to each other via a stretchable element 38 whose cut about corresponds to the cut of center part 28 and which also has a rear window cutout 40.

Stretchable portion 36 and stretchable element 38 are each made of an elastically stretchable fabric whose stretchability is greater than that of the fabric cuts forming center part 28 and side parts 30.

Folded portions 34, which are formed at the lateral edges of center part 28, additionally accommodate a tension cable 42 which ensures that the edge of center part 28 is in tight-fitting contact with respective side part 30. Additionally, a filling strip 44 is accommodated in each of folded portions 34, said filling strip 44 compensating the difference between the thickness of stretchable portion 36 and the diameter of tension cable 42.

Additionally, side parts 30 each have a rain drain 46, which is used for water management in folding top 12, at their outer edges.

As shown in FIG. 7, folding top 12 is provided with a rear tension bow 48 to which the rear edge of top cover 24 is attached, both center part 28, which is made of the weather-resistant material, and stretchable element 38, which is made of the elastically stretchable fabric, being connected to tension bow 48 via a strip 50 or a beading 52. Tension bow 48 is height-adjustable according to double-headed arrow Z by means of a tension strap 54 and, thus, adaptable to the shapes of folding top 12 illustrated in FIGS. 1 and 2.

The top cover 24 illustrated in the drawing and described above works in the way described below.

Starting from the flattened shape of folding top 12, which is illustrated in FIG. 1 and in which top cover 24 or rather center part 28 and side parts 30 are in the relative position illustrated in FIG. 6a, corner bow 26 is extended so as to realize the widened shape. In doing so, stretchable element 38, which extends below center part 28, is stretched according to arrow Y in FIG. 6b, causing the lateral edges of center part 28 to each move in the direction of the respective inner edge of respective side part 30 and the stretchable portions 36 to be relaxed.

When the flattened top shape is to be reestablished, corner bow 26 is retracted, causing stretchable element 38 to contract in the transverse direction of the top and stretchable portions 36 to be stretched. In this way, the inner edges of side parts 30 are each shifted inward away from respective folded portion 34 of center part 28 according to arrow YY in FIG. 6a. In the process, folded portions 34 slide on the outer surfaces of side parts 30.

REFERENCE SIGNS 10 motor vehicle
12 folding top
14 top storage space
15 top storage space lid
16 header
18 windshield
20 top linkage
22 main bearing
24 top cover
26 corner bow
28 center part
30 side part
32 rear window cutout 34 folded portion
36 stretchable portion
38 stretchable element
40 rear window cutout
42 tension cable
44 filling strip
46 rain drain
48 tension bow
50 strip
52 beading
54 tension strap
151 weather strip

The invention claimed is:

1. A top of a convertible vehicle, the top comprising: a top linkage and a top cover which comprises a first fabric cut and a second fabric cut connected to the first fabric cut,
 wherein the two fabric cuts are connected via a stretchable portion which is made of an elastically stretchable fabric whose stretchability is greater than that of the two fabric cuts, and
 wherein the first fabric cut is tensioned against the second fabric cut by means of a tension cable.

2. The top according to claim 1, wherein the first fabric cut covers the second fabric cut in an overlap area and the stretchable portion is disposed in the overlap area between the first fabric cut and the second fabric cut.

3. A top of a convertible vehicle, the top comprising: a top linkage and a top cover which comprises a first fabric cut and a second fabric cut connected to the first fabric cut, wherein the two fabric cuts are connected via a stretchable portion which is made of an elastically stretchable fabric whose stretchability is greater than that of the two fabric cuts, wherein the stretchable portion extends into a folded portion of the first fabric cut and is attached to an upper surface of the second fabric cut.

4. A top of a convertible vehicle, the top comprising: a top linkage and a top cover which comprises a first fabric cut and a second fabric cut connected to the first fabric cut, wherein the two fabric cuts are connected via a stretchable portion which is made of an elastically stretchable fabric whose stretchability is greater than that of the two fabric cuts, wherein the top further comprises a second fabric cut, wherein which are each of the two second fabric cuts are connected to the first fabric cut via a respective stretchable portion.

5. The top according to claim 4, wherein at least one stretchable element is disposed between the two second fabric cuts, the at least one stretchable element being made of an elastically stretchable fabric whose stretchability is greater than that of the two fabric cuts and whose elasticity counteracts the elasticity of the two stretchable portions.

6. The top according to claim 4, wherein the two second fabric cuts each form a side part of the top cover, the side part being assigned to a roof side beam, and the first fabric cut forms a center part disposed between the two roof side beams and having a rear window cutout.

7. The top according to claim 6, wherein the at least one stretchable element runs parallel to the center part and has a rear window cutout.

8. The top according to claim 1, wherein the top linkage comprises a corner bow which is height-adjustable when the top is in a closed position.

9. The top according to claim 1, wherein the top further comprises a rear tension bow which is connected to a rear edge of the top cover and which is height-adjustable when the top is in a closed position.

* * * * *